United States Patent [19]

Ross

[11] Patent Number: 4,678,090

[45] Date of Patent: Jul. 7, 1987

[54] LATCH

[75] Inventor: Sherwood B. Ross, Miami, Fla.

[73] Assignee: Ross Bicycles Inc., Rockaway Beach, N.Y.

[21] Appl. No.: 776,756

[22] Filed: Sep. 16, 1985

[51] Int. Cl.⁴ .............................................. A47F 5/00
[52] U.S. Cl. .............................. 211/150; 280/33.99 H
[58] Field of Search ................. 211/150, 183, 90, 189,
211/195; 160/135, 351; 250/33.99 R, 33.99 A,
33.99 S, 33.99 T; 248/240.4, 293; 292/229, 228,
219; 108/124, 134

[56] References Cited

U.S. PATENT DOCUMENTS

| | | | |
|---|---|---|---|
| 3,191,959 | 6/1965 | Heimbruich et al. | 280/33.99 R |
| 3,840,242 | 10/1974 | Craig, Sr. et al. | 280/33.99 H |
| 3,840,243 | 10/1974 | Rheinhart et al. | 280/33.99 H X |
| 3,971,568 | 7/1976 | Wright | 280/33.99 H |
| 3,977,689 | 8/1976 | Rosa | 280/33.99 H |

Primary Examiner—Ramon S. Britts
Assistant Examiner—Sarah A. Lechok Eley
Attorney, Agent, or Firm—Lilling & Greenspan

[57] ABSTRACT

The improved latch is used for selectively securing and releasing a shelf in a storage unit. This improved latch includes a pivot leg, first and second connecting legs and a support leg. A spring or other biasing means is used between the pivot leg and a bolt of the hinge, and the latch is designed to rotate about the bolt of the hinge. The first connecting leg extends outside of the storage unit, and the second connecting leg extends through a respective side panel of the storage unit and connects the first connecting leg and the support leg. In operation, the upward moving shelf first pushes the latch out of the way and, after the shelf is moved completely upward, the latch springs back into position and the support leg holds the shelf firmly in position.

7 Claims, 13 Drawing Figures

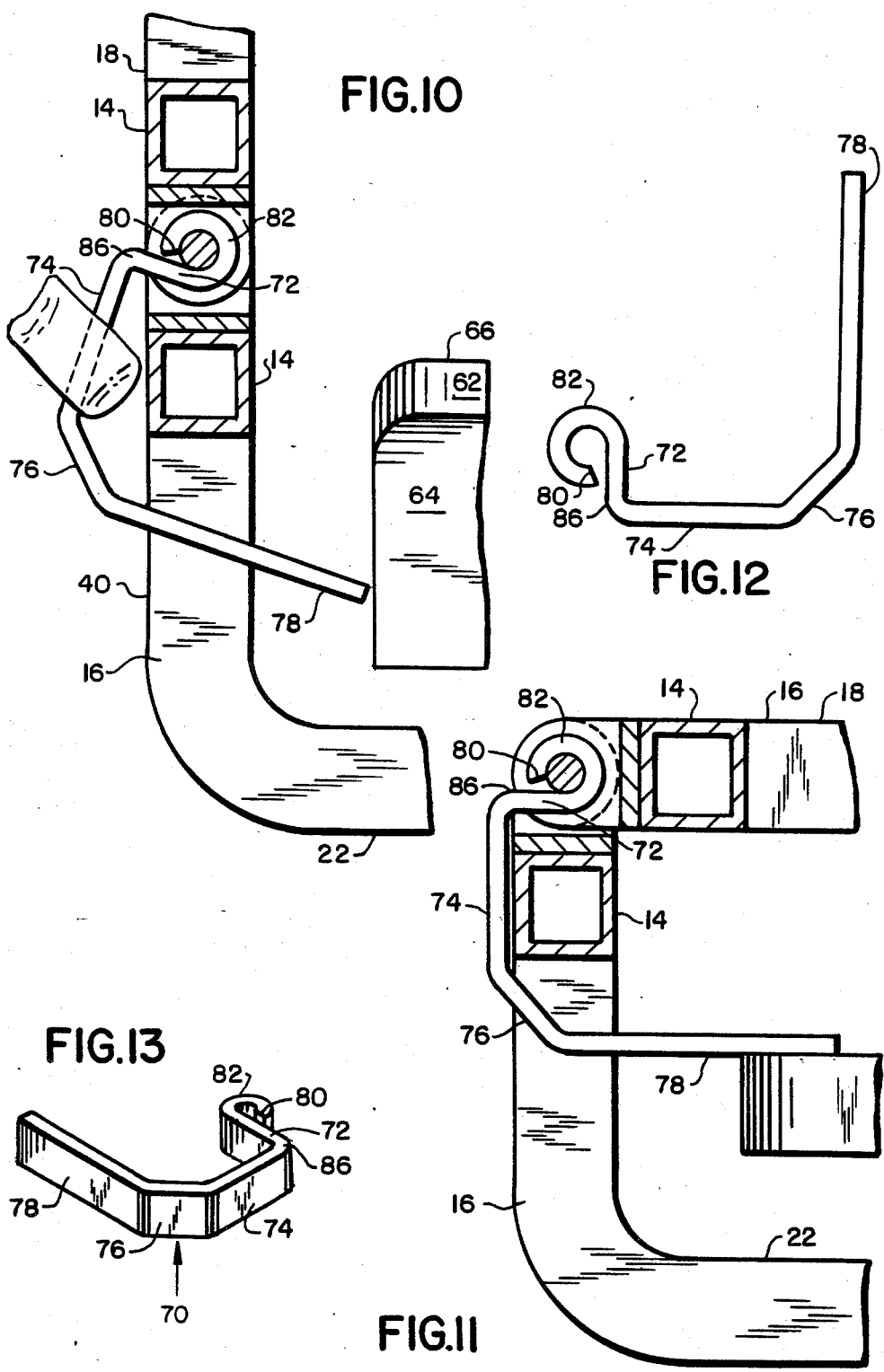

LATCH

BACKGROUND OF THE INVENTION

For purposes of bulk transfers of mail within the U.S. Postal Service, open topped containers in which mail may be placed are generally used. When not in use, these mail containers can be nested for easy storage. To move these containers easily, the U.S. Postal Service uses what it refers to as a General Postal Mail Container (hereinafter "GPMC"). A GPMC has an upper and lower shelf on which the mail crates can be supported. For easy storage, when not in use, a GPMC can fold to an almost flat position.

This invention concerns itself with the latch that is used to hold the shelf of a GPMC in a storage position when not in use.

DESCRIPTION OF THE PRIOR ART

Attention is directed to FIGS. 4–7 herein, which constitute drawings of a GPMC that is now in use by the U.S. Postal Service and which includes the prior art latch.

As shown, the GPMC has a cage-like structure with vertical and horizontal bars defining the rear and side panels. An upper shelf is hinged to the back panel of the GPMC for rotation from an open or horizontal position to a vertical or closed position.

A spring loaded latch is used to hold the shelf in position when not in use. The problem with this latch is that, to engage the latch in order to lower the shelf to a working position, the user's finger is dangerously exposed and, on many occasions, this has resulted in accidents and injuries to fingers and hands.

SUMMARY OF THE INVENTION

One of the objects of this invention is to provide an improved latch for a General Postal Mail Container or the like which will be safe in operation and will prevent injury to users.

The improved latch of this invention is spring loaded and extends around the outside of the unit, as opposed to around the inside of the unit, in order to provide safer operation of the latch. In order to disengage the latch to permit movement of the shelf to a work position, the user's fingers are not exposed and the risk of injury is significantly reduced.

BRIEF DESCRIPTION OF THE DRAWINGS

FIG. 10 is a top view, partially in section, and showing the working position of the improved latch of this invention.

FIG. 11 is a top view, partially in section, of the general postal mail container shown in FIG. 3, and which shows the improved latch of this invention.

FIG. 12 is a top plan view of the improved latch of this invention.

FIG. 13 is a perspective view of the improved latch of this invention.

DETAILED DESCRIPTION OF THE INVENTION

The improved latch of this invention is for use in conjunction with General Postal Mail Containers (hereinafter "GPMC"), but it may be used on any type of unit which requires the movement of a shelf or other panel from one position to another. Though the improved latch is shown in conjunction with a GPMC, it can obviously be used with other devices of similar open frame or cage structure.

Figure 1:
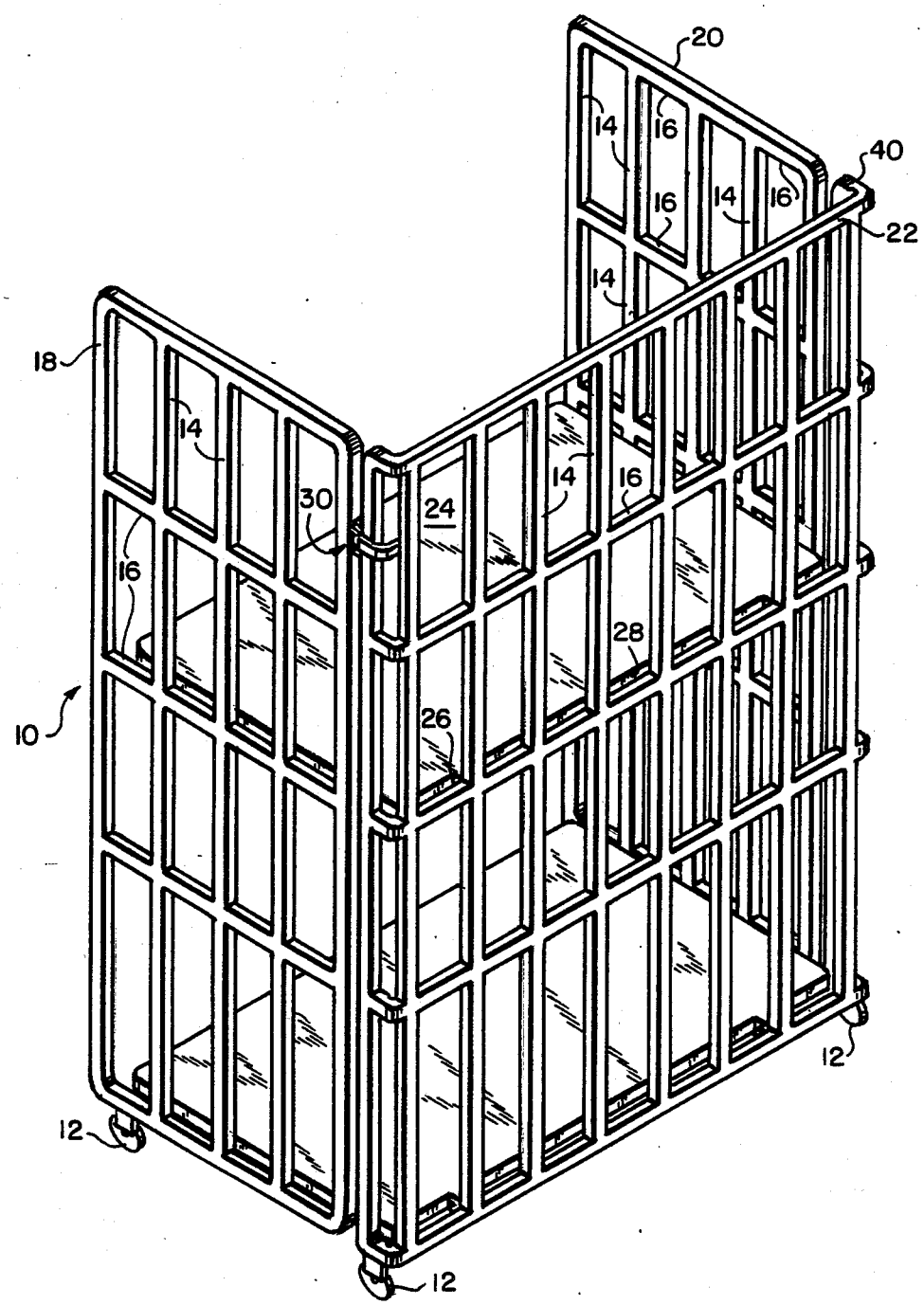
FIG. 1 is a perspective view of a general postal mail container in an open position, and which shows the improved latch of this invention.
Figure 2:
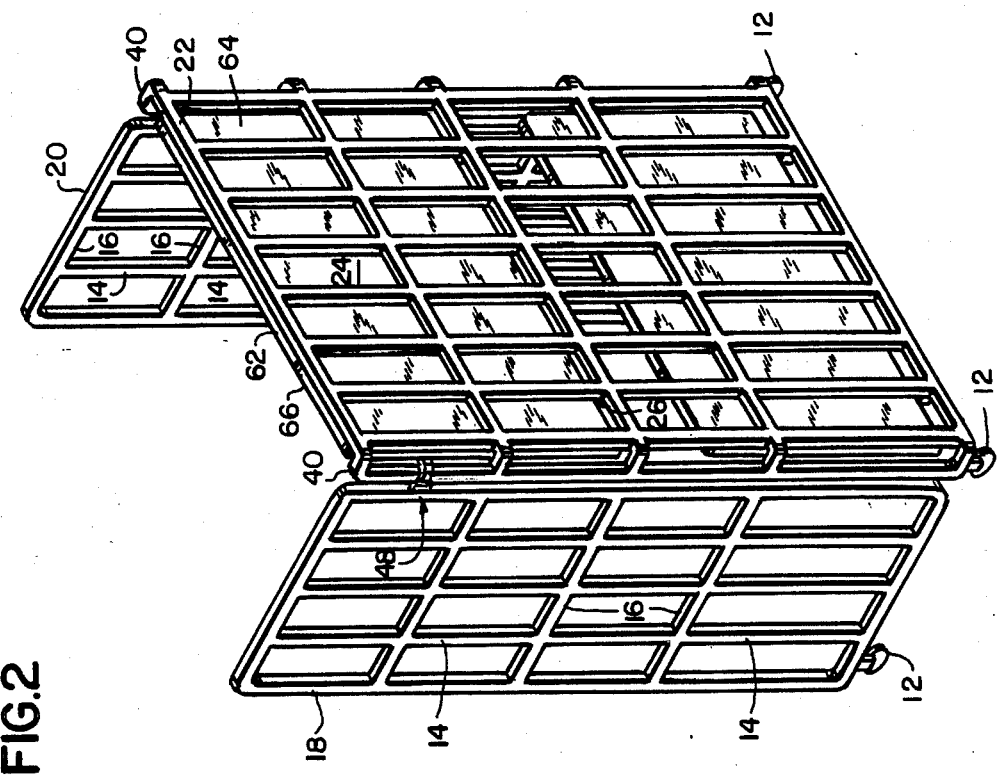
FIG. 2 is a perspective view of a general postal mail container with the shelf in a storage position, and which shows the improved latch of this invention.

A GPMC 10 is used by the U.S. Postal Service to transport mail containers. As best shown in FIG. 1, a GMPC is a cage-like structure and vertical bars 14 and horizontal bars 16 make up the right, left and rear panels 18, 20 and 22 of the unit. A shelf 24 is disposed horizontally within the GPMC and supports the mail containers. Hinges 26 are preferably used to affix the back edge 28 of the shelf to one of the horizontal bars 16 of the rear panel 22. The shelf 24 can thus rotate from a horizontal or work position (FIG. 1) to a vertical or storage position (FIGS. 2 and 3).

Figure 3:
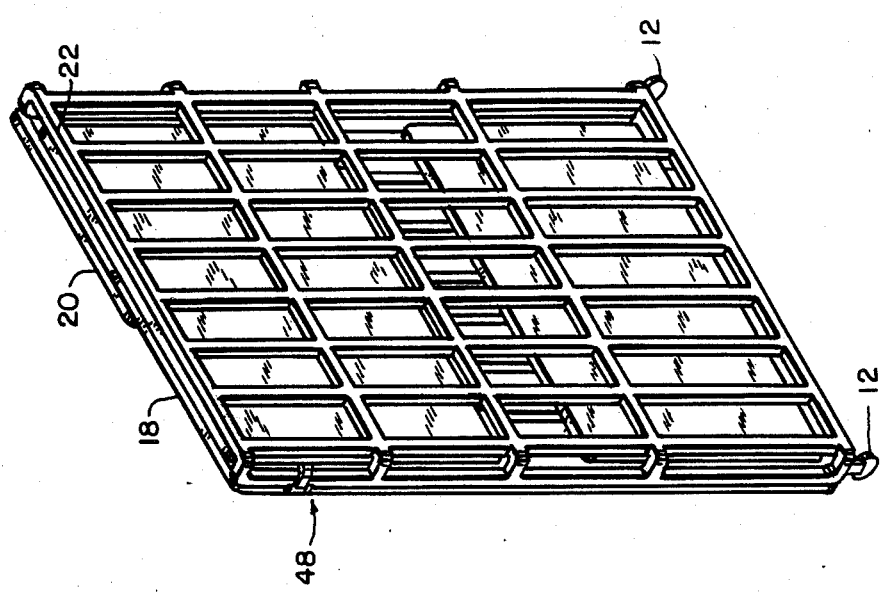
FIG. 3. is a perspective view of a general postal mail container that is entirely closed for storage purposes, and which shows the improved latch of this invention.

The right and left panels 18 and 20 are connected to the rear panel 20 by means of hinges 30, so that the unit can be closed into a compact position (FIG. 3). For ease of movement, wheels or rollers 12 may be provided on the bottom surfaces of the right, left and rear panels 18, 20 and 22.

The GPMC is well known in the industry and its construction is well known to those skilled in the trade. It is typically made of metal, but it can be made of any other suitable material.

The hinges 30 (see FIGS. 5 and 9) each comprise a pair of parallel horizontal rings or discs 32 which extend rearward from a back edge 36 of the right and left side panels 18 and 20, and also a pair of parallel horizontal rings or discs 34 that extend forward from front edges 38 of the rear panel 22. In this regard, the rear panel 22 is U-shaped and has right and left extensions 40 which extend at approximately 90° from the rear panel 22 itself, though the entire rear panel is made integral. The pair of rings 34 is thus located on the front edge 38 of the extensions 40. As shown, the rings 34 are closer together than the rings 32 and the rings 34 can be aligned between the two rings 32. Obviously, this arrangement can be reversed and the rings 32 can be closer together and aligned between the rings 34. A bolt 42 passes through an opening 44 in each of the rings 32 and 34 and is held securely by a nut (not shown). Washers may be used to permit easy rotation of the rings (and the panels) about the bolt. It will be observed that the rings are spaced from each other, so that there will not be any undue friction and the right and left panels can rotate freely about the bolt. (For the sake of clarity, FIGS. 5 and 9 show the prior art latch and the improved latch of this invention, respectively, as they would be mounted on the left side of a unit, as opposed to the right side, as these latches are shown in FIGS. 4, 6-8, and 10-11.)

This invention concerns itself with the latch that is used to support the shelf 24 in a vertical or storage position (FIGS. 2 and 3). FIGS. 4-7 show the prior art latch, and FIGS. 8-13 show the improved latch of this invention.

Figure 4:
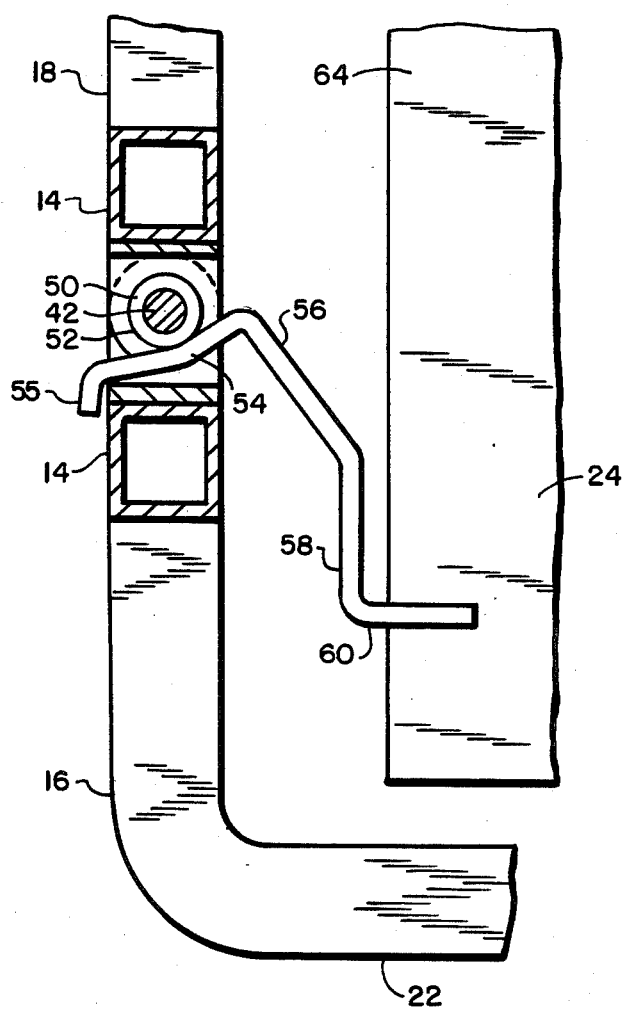
FIG. 4 is a top view, partially in section, of the general postal mail container shown in FIG. 1, and which shows the prior art latch.
Figure 5:
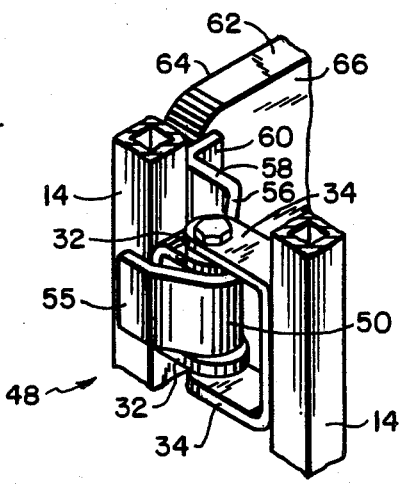
FIG. 5 is a perspective view of the prior art latch and which shows the latch supporting a shelf in a storage position. (For the sake of clarity, this figure shows the latch on the left hand side of the unit, instead of the right hand side of the unit.)
Figure 6:
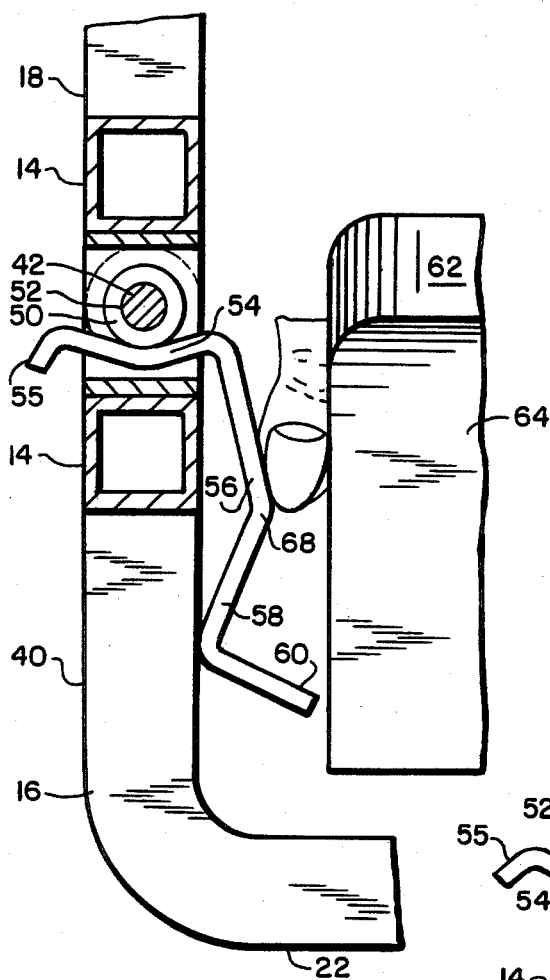
FIG. 6 is a top view, partially in section, and which shows the operation of the prior art latch.
Figure 7:
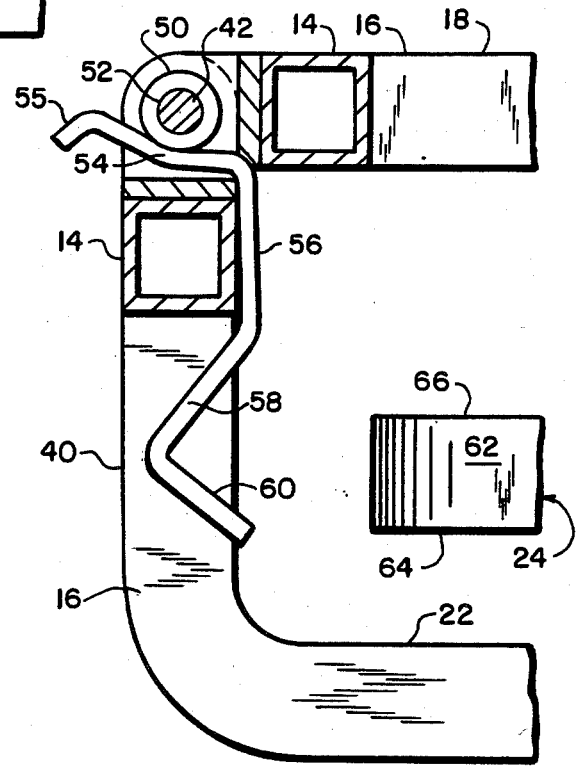
FIG. 7 is a top view, partially in section, of the general postal mail container shown in FIG. 3, and which shows the prior art latch.

The prior art latch 48 is typically positioned around the bolt 42 in the upper right hand side hinge 30 (FIGS. 4, 6 and 7; or the left side (FIG. 5)), and in the vicinity between the rings 32 that are attached to the rear panel 22. The prior art latch 48 includes a tubular member 50 which fits around the bolt 42 and a helical spring 52 is generally used between the tubular member 50 and the bolt 42 in order to bias the prior art latch 48, so that it will return to its initial position (shown in FIG. 4). The prior art latch 48, for ease of definition, includes leg portions 54, 56, 58 and 60, and the angles of these legs to each other can be observed from FIGS. 4-7.

The leg 54 is secured to the tubular member 50 by any accepted method, such as welding. As shown, leg 54 is not exactly straight and is bent so that its two ends define an obtuse angle at their junction at which the tubular member 50 is affixed to the leg 54; and the leg 54 has a tab 55 which extends slightly outside the unit. The leg 56 is positioned at essentially a right angle to the inside end of the leg 54. The leg 58 is at an angle to the leg 56, and the leg 60 is at essentially a right angle to the leg 58.

In the work position of the GPMC (FIG. 1), the shelf 24 is in an essentially horizontal position and is supported by clasps or clips (not shown) which extend from respective horizontal bars of the right and left panels, and the prior art latch 48 is in its nonworking position (FIG. 4). In order to move the shelf to a storage position, the front edge 62 is lifted upward. As the shelf is rotated upward, the top surface 64 of the shelf, in the vicinity of the right front edge 62, comes into contact with the leg 60 of the prior art latch 48 (FIG. 6). Because the latch is biased around the bolt 42, this motion causes the latch 48 to rock or rotate about the bolt 42 and the shelf pushes the leg 60 to the side (FIG. 6). When the front edge 62 of the shelf is completely behind the leg 60, there is no further force on the latch and the helical spring 52 returns the latch to its initial position (FIG. 5). In this position, the bottom surface 66 of the shelf, in the vicinity of the right front edge 62, rests against the back side of the leg 60. Because of the manner of construction and the manner in which the prior art latch 48 is biased, even though the shelf is pressing against the latch from the rear, the latch is unable to move any further and the shelf is held securely.

To release a shelf, the user would push the latch at the junction 68 between the legs 56 and 58 (FIG. 6). This causes the latch to move to the side and away from the shelf, so that the leg 60 is no longer inhibiting the downward movement or rotation of the shelf. One of the problems with the prior art latch is that, when the user pushes at the latch to release the shelf, the finger is exposed to the shelf and the latch and can be frequently mangled or otherwise injured.

Another disadvantage of the prior art latch becomes evident when the GMPC is closed. To close the GPMC, the right and left panels are rotated rearward until they are essentially parallel to the rear panel (FIG. 3). As shown in FIG. 7, however, this motion of the right side panel 18 causes a portion of the right side panel to engage the intersection of the legs 54 and 56 of the prior art latch and to cause movement of the leg 54 of the latch 48 and rotation of the latch, which causes the leg 60 to become disengaged from the shelf 24. Accordingly, the latch is no longer holding the shelf in position and only the closed side panels of the unit are holding the shelf in position. Therefore, when the unit is opened, the user must be extremely careful, because the prior art latch 48 is not holding the shelf, and the shelf can come crashing down on the user if he is not careful and aware. In other words, because of the construction of the prior art latch, it does not securely hold the shelf when the GPMC is folded into a storage position.

The invention of this application may be used in precisely the same type of GPMC as the prior art latch 48 is currently used. In FIGS. 8-11, the same reference numerals are used to identify the corresponding elements that are shown in FIGS. 4-7. The only difference between the drawings is that the improved latch of this invention is shown in FIGS. 8-11, instead of the prior art latch 48. In all other respects, the construction of the GPMC is identical.

The improved latch 70 of this invention is preferably made from carbon steel, but it can be made from any other suitable material, depending upon the specific application of the latch.

As shown in FIGS. 12 and 13, for ease of definition, the latch 70 can be said to include four basic elements. A pivot leg 72 has its extreme end 80 rolled back over itself in order to define a loop 82. The loop 82 of the pivot leg 72 is inserted around the bolt 42, and a helical spring 84 is preferably positioned between the loop 82 and the bolt 42 in order to bias the latch 70. As shown, the second end 86 of the pivot leg 72 extends outside of the GPMC and is connected to a connecting leg 74 at substantially a right angle. A second connecting leg 76 is connected at an angle of about 45° to the other end of the connecting leg 74. A support leg 78 is connected at about an angle of 45° to the second connecting leg 76, and the end 86 of the pivot leg 72 and the support leg 78 are substantially parallel. It is noted that the connecting legs 74 and 76 are positioned outside of the GPMC, whereas the connecting legs 56 and 58 of the prior art latch 48 are positioned inside the GPMC. This distinction is important for safety reasons. Because the connecting legs 74 and 76 are outside of the GPMC, they can be engaged by the user without risk of injury to one's fingers or other extremities.

Figure 8:
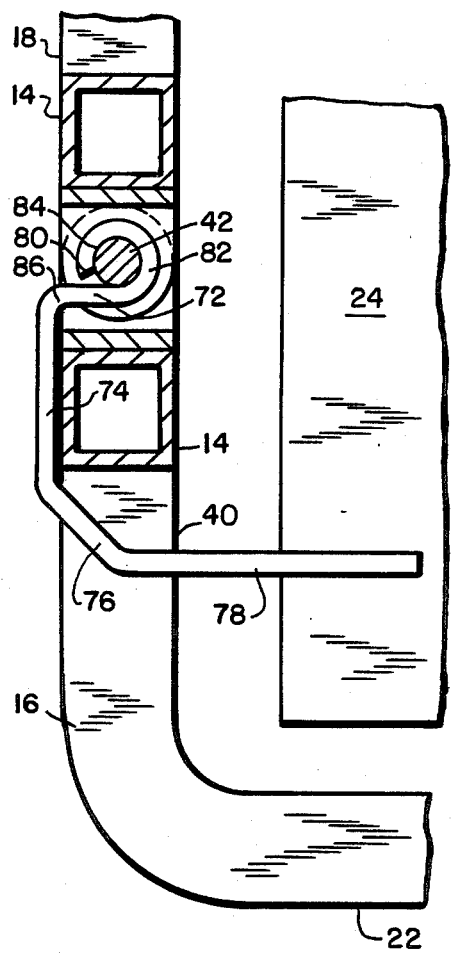
FIG. 8 is a top view, partially in section, of the general postal mail container shown in FIG. 1, and which shows the improved latch of this invention.
Figure 9:
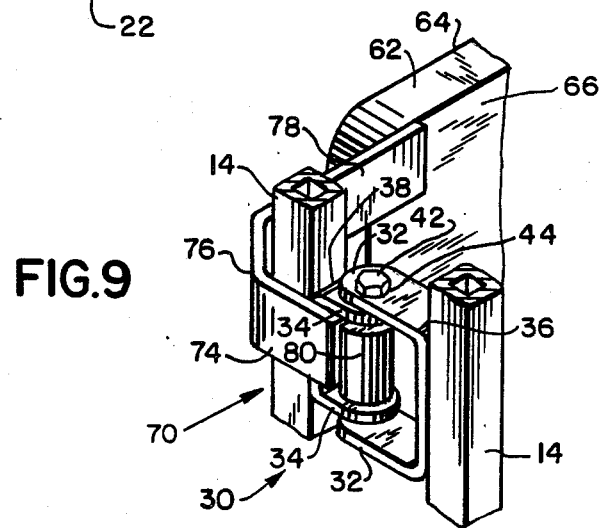
FIG. 9 is a perspective view of the improved latch of this invention and which shows the latch supporting a shelf in a storage position. (For the sake of clarity, this figure shows the latch on the left hand side of the unit, instead of on the right hand side of the unit.)

In the open position of the GPMC (see FIG. 1), the shelf 24 is in a down or horizontal position, and the position of the improved latch 70 is shown in FIG. 8. As seen, the connecting leg 74 is approximately parallel to the extension 40 and the support leg 78 is approximately parallel to the rear panel 22. As the front edge 62 of the shelf is rotated upward, the top surface 64 of the shelf, in the vicinity of the right front edge 62 of the shelf, comes into contact with the support leg 78. This causes the latch 70 to rotate about the bolt and for the shelf to push the latch out of position (see FIG. 10). After the front edge 62 of the shelf passes completely behind the support leg 78, the helical spring 84 returns the latch to the normal position (FIG. 9). The bottom surface 66 of the shelf, in the vicinity of the front edge 62 of the shelf, is now in contact with the support leg 78 and the latch 70 holds the shelf firmly in place.

To release the shelf, the user moves his fingers along the outside, and not the inside, of the GPMC and pulls outwardly on the connecting leg 74 (FIG. 10). This causes rotation of the latch around the bolt 42 and movement of the support leg 78 away from the front edge 62 of the shelf. As a result, the shelf can be lowered to its work position. Because of the fact that the latch is engaged from outside of the GPMC, the user's fingers are not put at risk and there is little likelihood of injury to the user.

When the right and left panels 18 and 20 are rotated to a closed position, they do not interact with the improved latch 70, as is true with the prior art latch 48. More particularly, because the end 86 of the pivot leg 72 extends outwardly from the side hinge 30, and not inwardly, the right panel 18 does not interact with the latch 70 when the GPMC is closed for storage (see FIG. 11). Therefore, in the closed position of the GPMC, the support leg 78 still holds the unused shelf securely in the storage position (see FIG. 11). As a result, when the GPMC is opened and the right and left panels are rotated to an open positon, the shelf is still held securely and it does not come crashing down on the user of the unit.

It can be appreciated that the latch of this invention can be used on either or both sides of the unit to hold the shelf. Moreover, it is possible to include two or more shelves in a unit which are held in position by the latch of this invention. Further, the latch can be used on any storage unit which has a pivoting shelf.

In some embodiments, it may be desirable to not include the biasing spring 80 but in such event it would be necessary for the user to move the latch back and forth from one position to another. Further, the latch can be used on any storage unit which has a pivoting shelf.

As a result, the improved gate latch of this invention provides a much more secure method of supporting the shelves in a storage unit, and provides greater safety to the user.

I claim:

1. An improved latch for selectively securing and releasing a shelf in a storage unit having side and rear panels and hinge means connecting said side panels to said rear panel, comprising:
   a pivot leg rotatable about a bolt means of said hinge means;
   a first connecting leg extending at an approximate angle of 90° from said pivot leg and said first connecting leg extending along a respective side panel and outside said storage unit;
   a second connecting leg extending at approximately an angle of 45° from said first connecting leg; and
   a support leg extending at an approximate angle of 45° from said second connecting leg and extending within said storage unit to selectively secure said shelf in a storage position.

2. An improved latch according to claim 1, further comprising a biasing means to rotate the latch about said bolt means to move it from a working position to a non-working position.

3. An improved latch according to claim 2, wherein said pivot leg includes a first end that is rolled back over the pivot leg to define a loop and said loop is rotatable about said bolt means, and a second end of said pivot leg extends out of said storage unit.

4. An improved latch according to claim 3, wherein said second connecting leg extends through a respective side panel of said storage unit to connect said first connecting leg and said support leg.

5. An improved latch according to claim 4, wherein said biasing means includes a helical spring positioned between said loop of said pivot leg and said bolt means.

6. An improved latch according to claim 1, wherein said pivot leg includes a first end that is rolled back over the pivot leg to define a loop and said loop is rotatable about said bolt means, and a second end of said pivot leg extends out of said storage unit.

7. An improved latch according to claim 6, wherein said second connecting leg extends through a respective side panel of said storage unit to connect said first connecting leg and said support leg.

* * * * *